United States Patent Office.

EUGEN A. BAUMANN, OF FREIBURG, GERMANY, ASSIGNOR TO FARBENFABRIKEN, VORMALS FR. BAYER & CO., OF ELBERFELD, GERMANY.

SULPHO COMPOUND.

SPECIFICATION forming part of Letters Patent No. 442,094, dated December 9, 1890.

Application filed September 24, 1888. Serial No. 286,192. (Specimens.)

*To all whom it may concern:*

Be it known that I, EUGEN A. BAUMANN, a subject of the Emperor of Germany, residing at Freiburg, Duchy of Baden, Germany, have discovered a new and useful Improvement in the Manufacture of a New Pharmaceutical Product, of which the following is a specification.

My invention relates to the production of a new pharmaceutical product with soporific properties, and the chemical name of which is "diethylsulfone-diethyl-methane." I have found that diethylketone reacts readily with ethylmercaptan in the presence of hydrochloric acid. One molecule of water is separated and a new chemical body, the mercaptole of the diethylketone is formed. If this body is treated with permanganate, the above-mentioned new product is formed.

In the following I give an exact description of the manner in which the new substance can be manufactured. One molecular proportion of diethylketone is mixed with two molecular proportions of ethylsulphydrate (ethylmercaptan) and hydrochloric acid is added. The condensation of the two substances to the new mercaptole sets in immediately and is accompanied by the separation of one molecule of water. After some hours the reaction is complete. Water is then added and the new product separates like an oil, which, dried with calcium chloride, distils at 225° to 230°, and which has the following chemical constitution:

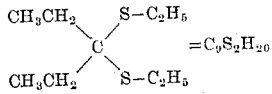

and the chemical name diethylketone-ethyl-mercaptole or dithirathyl-diethyl-methane.

This product is a colorless oil having an unpleasant odor. This new mercaptole can be easily oxidized with permanganate to a new sulfone, which has the following constitution:

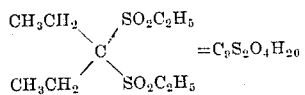

and the chemical name is diethylsulfone-diethyl-methane. One part of the mercaptole is treated with a solution of permanganate with the addition of an acid until the permanganate is no longer discolored. The solution is then heated to boiling, filtered, and evaporates. The new product is then obtained in crystalline scales of silver luster. It melts at 87°. It is sparingly soluble in cold water, easily in hot water, also in ether, alcohol, and benzole. It melts in boiling water and has no smell, and but a weak, bitter taste. It is an indifferent product, and dissolves in concentrated sulphuric acid.

It is obvious that with my compound, like other compounds for hypnotic use, the mode of use, quantity, and frequency of dose must be dependent upon the condition of the person to whom it is administered, and such condition will of course be known to the person administering it.

What I claim as my invention, and desire to secure by Letters Patent, is—

The new product herein described, being a sulphone melting at 87° centigrade, crystallizing in silvery scales, difficultly soluble in cold water, easily in hot water, ether, alcohol, and benzole, without smell, and having but a weak bitter taste, and having formula $C_9S_2O_4H_{20}$, substantially as described.

EUGEN A. BAUMANN.

Witnesses:
 WM. DIESTEL,
 H. BOEDRINGHAUS.